United States Patent
Seok et al.

(10) Patent No.: US 9,456,329 B2
(45) Date of Patent: Sep. 27, 2016

(54) METHOD AND APPARATUS FOR DISABLING AN ILLEGAL DEVICE IN A WIRELESS LAN SYSTEM

(75) Inventors: Yongho Seok, Anyang-si (KR); Jihyun Lee, Anyang-si (KR); Eunsun Kim, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 228 days.

(21) Appl. No.: 13/522,012

(22) PCT Filed: Sep. 20, 2011

(86) PCT No.: PCT/KR2011/006931
§ 371 (c)(1),
(2), (4) Date: Jul. 12, 2012

(87) PCT Pub. No.: WO2012/039574
PCT Pub. Date: Mar. 29, 2012

(65) Prior Publication Data
US 2013/0163574 A1    Jun. 27, 2013

Related U.S. Application Data

(60) Provisional application No. 61/384,316, filed on Sep. 20, 2010, provisional application No. 61/387,973, filed on Sep. 29, 2010, provisional application No. 61/391,072, filed on Oct. 7, 2010.

(51) Int. Cl.
*H04W 12/08* (2009.01)
*H04W 8/00* (2009.01)
*H04W 16/14* (2009.01)
(Continued)

(52) U.S. Cl.
CPC ............ *H04W 8/005* (2013.01); *H04W 12/08* (2013.01); *H04W 16/14* (2013.01); *H04W 48/16* (2013.01); *H04W 84/12* (2013.01)

(58) Field of Classification Search
None
See application file for complete search history.

(56) References Cited

U.S. PATENT DOCUMENTS

2006/0178145 A1* 8/2006 Floam .................. H04W 24/00
                                                          455/434
2009/0290537 A1* 11/2009 Berglund ............ H04L 12/4633
                                                          370/328
(Continued)

FOREIGN PATENT DOCUMENTS

| CN | 101167377 | 4/2008 |
| CN | 101277229 | 10/2008 |
| WO | 2006/102793 | 10/2006 |

OTHER PUBLICATIONS

Yonghong Zeng et al., "Worldwide Regulatory and Standardization Activities on Cognitive Radio", IEEE Symposium on New Frontiers in Dynamic Spectrum, pp. 1-9, Apr. 2010.

(Continued)

*Primary Examiner* — Huy D Vu
*Assistant Examiner* — Bao G Nguyen
(74) *Attorney, Agent, or Firm* — Lee, Hong, Degerman, Kang & Walmey; Jonathan Kang; Michael Monaco

(57) ABSTRACT

A method for an enabler entity to indicate an event to a manager entity includes transmitting, from the enabler entity to the manager entity, an event indication message indicating an event in a device served by the enabler entity. The enabler entity enables communication between the device and the manager entity and the manager entity exchanges information required for coexistence between enabler entities comprising the enabler entity. The event indication message includes type information indicating that the event indication message is for indicating that a specific device is detected by the device, the specific device operating on a frequency not permitted to the specific device.

12 Claims, 16 Drawing Sheets

(51) Int. Cl.
*H04W 48/16* (2009.01)
*H04W 84/12* (2009.01)

(56) References Cited

U.S. PATENT DOCUMENTS

2011/0087639 A1* 4/2011 Gurney ............ G06F 17/30442
                                                              707/690
2012/0057533 A1* 3/2012 Junell ................... H04W 16/14
                                                              370/329
2013/0155991 A1* 6/2013 Kazmi et al. ................ 370/329

OTHER PUBLICATIONS

Maziar Nekovee, "A survey of cognitive radio access to TV White Spaces", ICUMT, pp. 1-8, Oct. 2009.

Kim, et al., "Comment Discussion on map and enablement," IEEE P802.11 Wireless LANs, doc.: IEEE 802.11-10/1041r0, Sep. 2010, 8 pages.
Kim, et al., "Normative Text for White Space Map," IEEE P802.11 Wireless LANs, doc.: IEEE 802.11-10/0790r2, Jul. 2010, 20 pages.
Kang, et al., "System description and reference model proposal," IEEE P802.19 Wireless Coexistence, doc.: IEEE 802.19-10/0113r2, Sep. 2010, 28 pages.
Kasslin, et al., Coexistence architecture of 802.19.1, doc.: IEEE 802.19-10/0013r0, Jan. 2010, 12 pages.
Kim, et al., "TVWS Enablement Scenarios," doc.: IEEE 802.11-10/0720r0, Jun. 2010, 13 pages.
Ruuska, et al., "P802.19.1 System Architecture," doc.: IEEE 802.19-10/0046r3, Mar. 2010, 23 pages.

* cited by examiner

FIG. 4

| Category | Action Value | Requester STA Address | Responder STA Address | Reason Result Code | Enablement Identifier |
|---|---|---|---|---|---|
| 1 | 1 | 6 | 6 | 1 | 2 |

Octets:

FIG. 6

| Category | Action Value | Requester STA Address | Responder STA Address | Operating Class | Channel Number | Measurement Start Time | Measurement Duration |
|---|---|---|---|---|---|---|---|
| 1 | 1 | 6 | 6 | 1 | 1 | 8 | 2 |

Octets :

FIG. 7

| Category | Action Value | Requester STA Address | Responder STA Address | Measurement Start Time | Measurement Duration | Channel numbers |
|---|---|---|---|---|---|---|
| 1 | 1 | 6 | 6 | 8 | 2 | variable |

Octets :

FIG. 8

| Category | Action Value | Requester STA Address | Responder STA Address | Measurement Start Time | Measurement Duration | Illegal TVBD Address | Enabling STA Address of Illegal TVBD | Illegal TVBD Channel Number |
|---|---|---|---|---|---|---|---|---|
| 1 | 1 | 6 | 6 | 8 | 2 | 6 | 6 | variable |

Octets :

FIG. 11

| Element ID | Length | Enabling STA Address | Enabling STA Timestamp |
|---|---|---|---|

Octets :  1  1  6  8

FIG. 12

| Category | Action Value | Requester STA Address | Responder STA Address | Reason Result Code |
|---|---|---|---|---|

Octets :  1  1  6  6  1

FIG. 14

| Information Type | Length | Requester STA Address | Responder STA Address | Actual Measurement Start Time | Measurement Duration |
|---|---|---|---|---|---|

Octets: 1         6     6     8     2

| Policed TVBD Address | Enabling STA Address of Policed TVBD | Illegal TVBD Address | Enabling STA Address of Illegal TVBD | Illegal TVBD Channel Number |
|---|---|---|---|---|

Octets: 6     6     6     6     variable

FIG. 15

| Command Type | Length | Requester STA Address | Responder STA Address | Actual Measurement Start Time | Measurement Duration |
|---|---|---|---|---|---|

Octets : 1    6    6    8    2

| Policed TVBD Address | Enabling STA Address of Policed TVBD | Illegal TVBD Address | Illegal TVBD Channel Number |
|---|---|---|---|

Octets : 6    6    6    variable

METHOD AND APPARATUS FOR DISABLING AN ILLEGAL DEVICE IN A WIRELESS LAN SYSTEM

CROSS-REFERENCE TO RELATED APPLICATIONS

This application is the National Stage filing under 35 U.S.C. 371 of International Application No. PCT/KR2011/006931, filed on Sep. 20, 2011, which claims the benefit of U.S. Provisional Application Ser. No. 61/391,072, filed on Oct. 7, 2010, 61/387,973, filed on Sep. 29, 2010, and 61/384,316, filed on Sep. 20, 2010, the contents of which are all incorporated by reference herein in their entirety.

TECHNICAL FIELD

The present invention relates to a Wireless Local Area Network (WLAN) system, and more particularly, to a method and apparatus for de-enabling an illegal device in a WLAN system.

BACKGROUND ART

Standards for WLAN technology have been developed by the Institute of Electrical and Electronics Engineers (IEEE) 802.11 specifications. IEEE 802.11a and 802.11b use an unlicensed band at 2.4 GHz or 5 GHz. IEEE 802.11b provides a transmission rate of 11 Mbps and IEEE 802.11a provides a transmission rate of 54 Mbps. IEEE 802.11g applies Orthogonal Frequency-Division Multiplexing (OFDM) at 2.4 GHz to provide a transmission rate of 54 Mbps. IEEE 802.11n applies Multiple Input Multiple Output (MIMO)-OFDM to provide a transmission rate of 300 Mbps for four spatial streams. IEEE 802.11n supports a channel bandwidth up to 40 MHz to provide a transmission rate of 600 Mbps.

Currently, the IEEE 802.11 of standard, which specifies operation of an unlicensed device in a TV White Space (TVWS) band, is being developed.

A TVWS includes an Ultra High Frequency (UHF) band and a Very High Frequency (VHF) band as a frequency allocated to a broadcast TV and means a frequency band in which an unlicensed device is permitted to be used under the condition that it does not hinder communication of a licensed device operating in a corresponding frequency band. The licensed device may include a TV, a wireless microphone, etc. The licensed device may be called an incumbent user or a primary user.

Operation of all unlicensed devices is permitted in frequency bands of 512 to 608 MHz and 614 to 698 MHz except for a few special cases. However, in frequency bands of 54 to 60 MHz, 76 to 88 MHz, 174 to 216 MHz, and 470 to 512 MHz, communication only between fixed devices is permitted. The fixed devices refer to devices which transmit signals only at a given location. An IEEE 802.11 TVWS terminal refers to an unlicensed device operating using an IEEE 802.11 Media Access Control (MAC) layer and a physical layer (PHY) in a TVWS spectrum.

An unlicensed device which desires to use a TVWS should provide a protection function for a licensed device. Accordingly, the unlicensed device must confirm whether the licensed device occupies a corresponding band before starting signal transmission in the TVWS.

To this end, the unlicensed device should obtain channel list information usable in a corresponding area by accessing a geo-location database through the Internet or a dedicated network. The geo-location database is a database for storing and managing information of registered licensed devices, geo-locations of the licensed devices, and channel use information which dynamically varies over a channel use time.

Alternatively, the unlicensed device may confirm whether a corresponding band is being used by the licensed device by performing spectrum sensing. A spectrum sensing mechanism includes an energy detection scheme and a feature detection scheme. If strength of a signal received in a specific channel is above a prescribed value or if a DTV preamble is detected, the unlicensed device may determine that the licensed device is using the specific channel. If it is determined that the licensed device is being used in a channel immediately adjacent to a currently used channel, the unlicensed device should lower transmission power.

However, there may be unlicensed devices which attempt operation in an unusable channel or are operating in an unusable channel, without conforming to regulations. Accordingly, a method for detecting and then de-enabling such an illegal device is required.

DETAILED DESCRIPTION OF THE INVENTION

Technical Problems

As described above, since an unlicensed device which desires to use a white space (e.g. TVWS) should provide a protection function for a licensed device, a method for detecting and de-enabling the unlicensed device is required.

It is a technical object of the present invention to provide a method and apparatus for detecting and de-enabling an illegal device to protect a licensed device in a white space.

It will be appreciated by persons skilled in the art that the technical objects that can be achieved through the present invention are not limited to what has been particularly described hereinabove and other technical objects of the present invention will be more clearly understood from the following detailed description.

Technical Solutions

To achieve the above technical object, in a method for detecting an illegal device at a first station serving as an unlicensed device permitted to operate within an available channel which is not used by a licensed device in a TV White Space (TVWS) band in a wireless Local Area Network (WLAN) system in accordance with an aspect of the present invention, the first station receives a first available channel list from an enabling station of the first station, receives an enabling signal from a second station, and determines whether the second station is an illegal device by using the enabling signal and the first available channel list. The first station may be a dependent station and the second station may be an enabling station for controlling the dependent station.

If a channel from which the enabling signal is detected is not included in the first available channel list, the first station may determine that the second station is an illegal device in the determining step.

The first station may receive information about a device type to which the available channel list is applied from the enabling station, the enabling signal may include information about a device type of the second station, and the first station may determine whether the second station is an illegal device in the determining step in consideration of the device type to which the available channel list is applied and the device type of the second station.

The first station may receive a second available channel list from a third station, and if the second available channel list is different from the first available channel list, may determine that the third station is an illegal device.

The first station may receive, from the enabling station, a request frame including a monitoring target channel, wherein the enabling station requests the first station to monitor the monitoring target channel, and may receive the enabling signal by monitoring the monitoring target channel.

The request frame may further include a time duration during which the enabling station requests the first station to perform monitoring, and the first station may receive an enabling signal comprises receiving the enabling signal by performing monitoring during the time duration.

If the second station is an illegal device, the first station may transmit a report frame to the enabling station, wherein the report frame includes an address of the second station and a channel from which the enabling signal is detected.

The first station may receive an address of an enabling station of the second station, and the report frame may further include the address of the enabling station of the second station.

To achieve the above technical object, in a method for de-enabling an illegal device in a first station of a Wireless Local Area Network (WLAN) in accordance with another aspect of the present invention, the first station transmits a first available channel list to a second station, and receives a first report frame including an address of a third station which is judged to be an illegal device from the second station, wherein the third station is a device which is judged to be an illegal device by the second station using an enabling signal received from the third station and using the first available channel list. The first station may be an enabling station and the second station may be a dependent station controlled by the enabling station.

The first report frame may further include an address of an enabling station of the third station.

If the enabling station of the third station is identical to the first station, the first station may transmit a de-enablement frame for commanding the third station to be de-enabled to the third station.

The third station may transition to an un-enabled state upon receiving the de-enablement frame.

If the enabling station of the third station is different from the first station, the first station may transmit a second report frame (e.g. TVWS coexistence information frame) including the address of the third station and the address of the enabling station of the third station to a Coexistence Manager (CM). The second report frame may cause the CM to determine whether to de-enable the third station by using coexistence information of the TVWS coexistence information frame, and if the CM determines that the third station be de-enabled, may cause the CM to transmit a de-enablement command frame (e.g. a TVWS coexistence command frame) including the address of the third station to the enabling station of the third station. The enabling station of the third station may transmit a de-enablement frame for directing the third station to be de-enabled to the third station.

The second station may determine that the third station is an illegal device if a channel from which the enabling signal is detected is not included in the first available channel list.

The first station may transmit information about a device type to which the first available channel list is applied to the second station, the enabling signal may include information about a device type of the third station, and the second station may determine whether the third station is an illegal device in consideration of the device type to which the first available channel list is applied and the device type of the third station.

The first station may transmit a request frame including a monitoring target channel to request monitoring to the second station, and the second station may receive the enabling signal by monitoring the monitoring target channel.

To achieve the above technical object, a first station serving as an unlicensed device permitted to operate within an available channel which is not used by a licensed device in a TV White Space (TVWS) band in a wireless Local Area Network (WLAN) system in accordance with a further aspect of the present invention includes a reception module for receiving a first available channel list from an enabling station of the first station and receiving an enabling signal from a second station, and a processor for determining whether the second station is an illegal device by using the enabling signal and the first available channel list.

Advantageous Effects

According to embodiments of the present invention, a licensed device can be protected by efficiently detecting and de-enabling an illegal device using a channel which cannot be used by an unlicensed device in a TVWS band.

BRIEF DESCRIPTION OF THE DRAWINGS

FIG. 4 is a diagram illustrating a format of a DSE enablement frame.

FIG. 6 is a diagram illustrating an example of a format of a TVBD measurement request frame transmitted by an enabling STA to request monitoring to a dependent STA.

FIG. 7 is a diagram illustrating another example of a format of a TVBD measurement request frame transmitted by an enabling STA to a dependent STA to request monitoring.

FIG. 8 illustrates a format of a TVBS measurement report frame for reporting, at a dependent STA, detection of an illegal device to an enabling STA thereof.

FIG. 11 is a diagram illustrating a format of a DSE identifier element.

FIG. 12 is a diagram illustrating a format of a de-enablement frame.

FIG. 14 is a diagram illustrating a format of a TVWS coexistence information frame.

FIG. 15 is a diagram illustrating a format of a TVWS coexistence command frame.

BEST MODE FOR CARRYING OUT THE INVENTION

Hereinafter, exemplary embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment through which the present invention can be carried out. The following detailed description includes detailed matters to provide full understanding of the present invention. However, it will be apparent to those skilled in the art that the present invention can be carried out without the detailed matters.

In some instances, well-known structures and devices are omitted in order to avoid obscuring the concepts of the present invention and the important functions of the structures and devices are shown in block diagram form. The same reference numbers will be used throughout the drawings to refer to the same or like parts.

First, a general configuration of a WLAN will be described with reference to FIG. 1 and FIG. 2.

Figure 1:
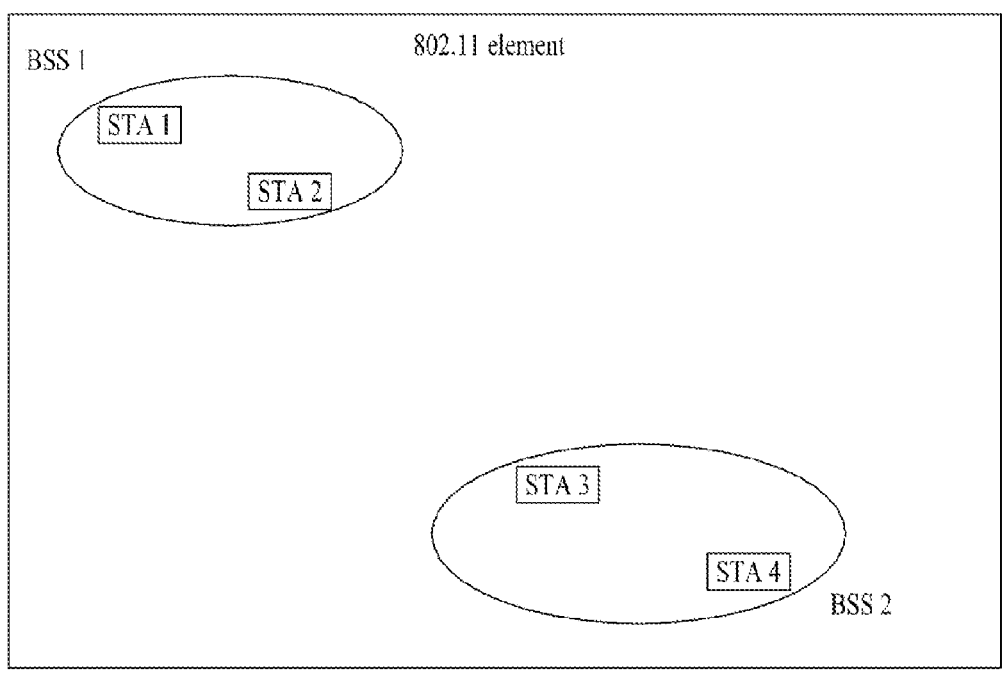
FIG. 1 is a diagram illustrating an example of the configuration of a WLAN system.

FIG. 1 is a diagram illustrating an example of the configuration of a WLAN system.

As shown in FIG. 1, the WLAN system includes one or more Basic Service Sets (BSSs). The BSS refers to a set of stations (STAs) which are successfully synchronized to communicate with one another.

The STA is a logical entity that contains a Medium Access Control (MAC) and a physical layer interface for a wireless medium, and includes an Access Point (AP) and a non-AP STA. A portable terminal manipulated by a user among STAs is a non-AP STA. The non-AP STA may be simply referred to as an STA. The non-AP STA may also be referred to as a terminal, a Wireless Transmit/Receive Unit (WTRU), a User Equipment (UE), a Mobile Station (MS), a Mobile Terminal, a mobile subscriber unit, etc.

The AP is an entity that provides access to a Distribution System (DS) to an STA associated therewith via a wireless medium. The AP may be referred to as a centralized controller, a Base Station (BS), a Node-B, a Base Transceiver System (BTS), a site controller, etc.

The BSS may be classified into an infrastructure BSS and an Independent BSS (IBSS).

The BSSs shown in FIG. 1 are IBSSs. The IBSS refers to a BSS which does not include an AP. Since the IBSS does not include an AP, it forms a self-contained network in which no access to a DS is available.

Figure 2:
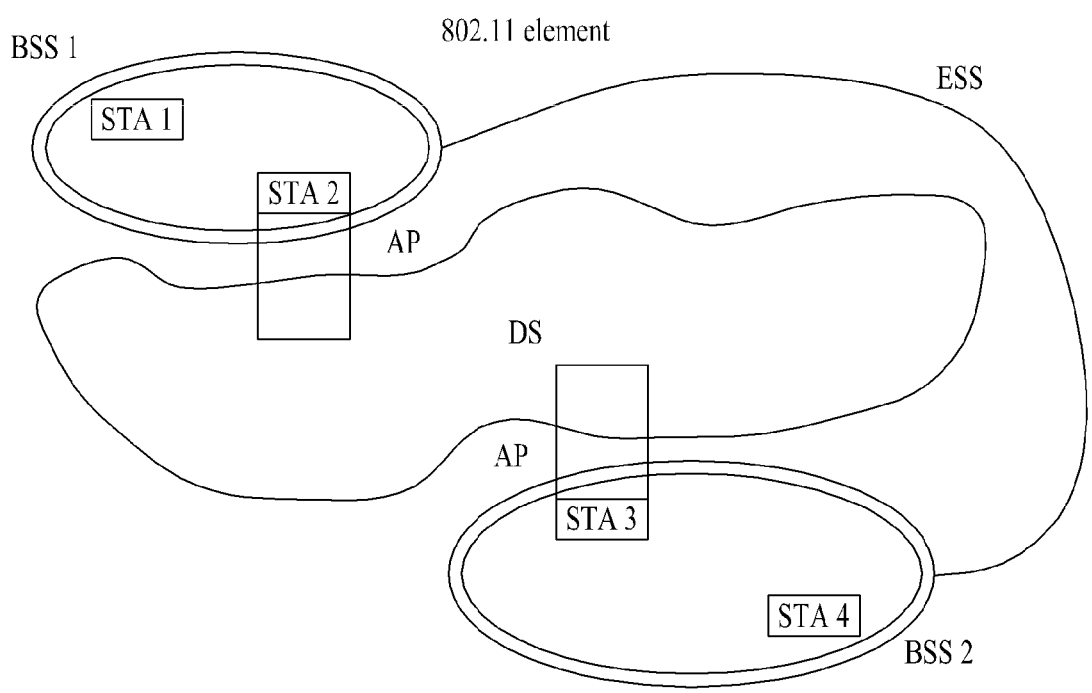
FIG. 2 is a diagram illustrating another example of the configuration of a WLAN system.

FIG. 2 is a diagram illustrating another example of the configuration of the WLAN system.

BSSs shown in FIG. 2 are infrastructure BSSs. The infrastructure BSS includes one or more STAs and APs. Although communication between non-AP STAs in the infrastructure BSS is basically performed via an AP, direct communication between the non-AP STAs may be performed when a direct link therebetween is established.

As shown in FIG. 2, a plurality of infrastructure BSSs may be interconnected through a DS. A plurality of BSSs interconnected through the DS is referred to as an Extended Service Set (ESS). STAs included in the ESS may communicate with one another. A non-AP STA may move from one BSS to another BSS while performing seamless communication within the same ESS.

The DS is a mechanism for connecting a plurality of APs. The DS is not necessarily a network, and has no format limitation as long as it can provide a prescribed distribution service. For example, the DS may be a wireless network such as a mesh network, or may be a physical structure for interconnecting APs.

Next, a procedure for enabling an STA for operation in a TVWS band and a procedure for obtaining an available channel list will be described.

An unlicensed device operating in a TVWS band may be divided into an enabling STA and a dependent STA. The enabling STA is an STA that can enable the dependent STA. The enabling STA can transmit signals without receiving an enabling signal and can initiate a network.

The enabling STA may register geo-location information in a database (DB) and acquire a channel list available at a corresponding geo-location from the DB. The enabling STA is not necessarily a WLAN STA and may be a logical entity or a network server which can provide services related to enablement.

The dependent STA is an STA that can transmit signals only upon receiving an enabling signal and is controlled by the enabling STA. The dependent STA should be enabled only through the enabling STA and cannot be independently enabled.

Figure 3:
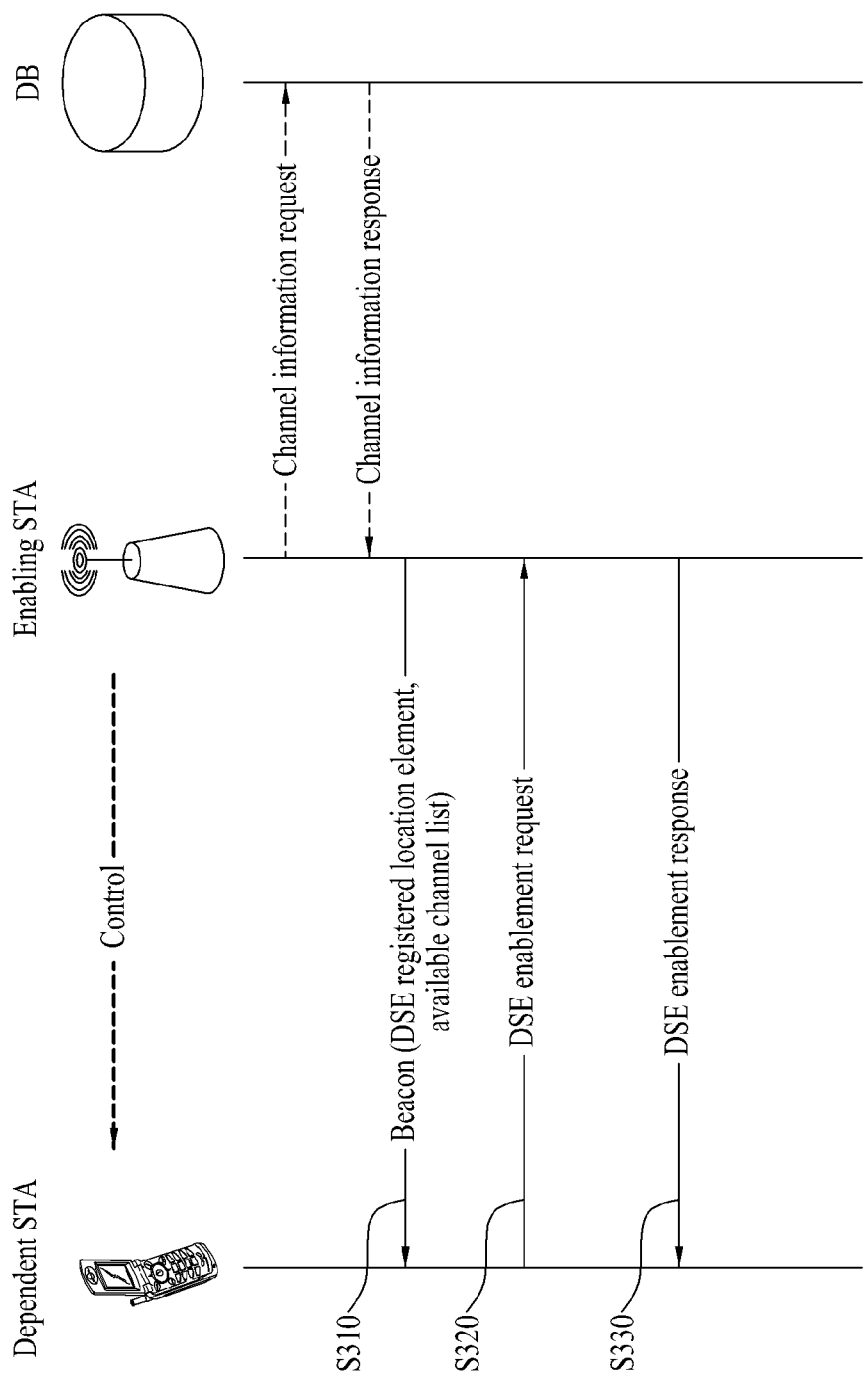
FIG. 3 is a diagram illustrating an STA enablement procedure.

FIG. 3 is a diagram illustrating an STA enablement procedure.

A procedure through which a dependent STA is enabled by an enabling STA may conform to a procedure similar to Dynamic STA Enablement (DSE) of IEEE 802.11y.

As shown in FIG. 3, the enabling STA transmits a beacon including a DSE registered location element (step S310). The DSE registered location element includes a RegLoc DSE bit set to 1. The enabling STA may transmit a probe response frame including the DSE registered location element. A signal indicating that enablement is possible is called an enabling signal. The beacon or probe response frame including the DSE registered location element is the enabling signal.

The dependent STA receiving and decoding the DSE registered location element may transmit a DSE enablement request frame to the enabling STA by using a channel indicated by the DSE registered location element (step S320) and may receive a DSE enablement response frame from the enabling STA (step S330).

FIG. 4 is a diagram illustrating a format of a DSE enablement frame. The DSE enablement frame may be a DSE enablement request frame or a DSE enablement response frame.

As illustrated in FIG. 4, the DSE enablement frame includes a category field, an action value field, a requester STA address field, a responder STA address field, a reason result code field, and an enablement identifier field.

The requester STA address field denotes a MAC address of an STA transmitting the DSE enablement frame, and the responder STA address field denotes a MAC address of an STA receiving the DSE enablement frame. The reason result code field indicates whether the DSE enablement frame is a DSE enablement request frame or a DSE enablement response frame. The enablement identifier field denotes an enablement ID allocated by the enabling STA to the dependent STA when the DSE enablement frame is the DSE enablement response frame.

Accordingly, if the DSE enablement frame is the DSE enablement request frame transmitted by the dependent STA, the requester STA address field denotes a MAC address of the dependent STA, the responder STA address field denotes a MAC address of the enabling STA, the reason result code field indicates that the DSE enablement frame is the DSE enablement request frame, and the enablement identifier field is filled with an invalid value.

If the DSE enablement frame is the DSE enablement response frame transmitted by the enabling STA, the requester STA address field denotes a MAC address of the enabling STA, the responder STA address field denotes a MAC address of the dependent STA, the reason result code field indicates that the DSE enablement frame is the DSE enablement response frame, and the enablement identifier field is filled with an enablement ID allocated to the dependent STA by the enabling STA.

Another enablement method uses a Registered Location Query Protocol (RLQP). This method performs DSE enablement using a Generic Advertisement Service (GAS) protocol of IEEE 802.11u. An STA supporting the GAS protocol includes an interworking element in the beacon frame and probe response frame. The STA transmits an advertisement protocol ID supported thereby through an advertisement protocol element.

In the enablement method using the RLQP, the beacon frame or probe response frame, which includes the advertisement protocol element including an advertisement protocol tuple including the protocol ID indicating the RLQP, is the enabling signal.

Namely, the enabling STA transmits the beacon frame or probe response frame which includes the advertisement protocol element including an advertisement protocol tuple including the protocol ID indicating the RLQP. The dependent STA transmits a DSE enablement request element using the GAS protocol upon receiving the beacon frame or probe response frame and is enabled upon receiving the DSE enablement response element from the enabling STA.

In order for an STA to operate in a white space band (e.g. TVWS band), a protection scheme for a licensed device should first be provided. Accordingly, the STA should find an available channel, which is not used by a licensed device and therefore can be used by an unlicensed device, and then operate in the available channel.

The STA may determine TV channel availability using a spectrum sensing method and a TV channel schedule identifying method through access to a DB. DB information includes information about a usage schedule of a specific channel of a licensed device at a specific location. Accordingly, an STA which desires to discern TV channel availability should acquire DB information based on its location information by accessing a DB via the Internet and this action should be performed in a time unit sufficient to protect the licensed device.

The enabling STA informs the dependent STA of whether a channel of a TV signal is occupied and which channels can be used by the unlicensed device. That is, the enabling STA transmits an available channel list to the dependent STA. Channels included in the available channel list are channels not used by signals which should be legally protected signals and are available to the unlicensed device when the unlicensed device accesses the DB.

The channels of the available channel list may have granularity of a minimum unit provided by the DB. Namely, if a channel of a minimum unit provided by a TV band DB for a TVWS is a TV channel, the available channel list is a list of TV channels which are available to the unlicensed device. For example, in the U.S. and Korea, the TV channel list may be a list of channels in units of 6 MHz and in other countries, it may be a list of channels in units of 7 MHz or 8 MHz.

The available channel list may be transmitted to the dependent STA from the enabling STA during the enablement procedure or after enablement is successfully performed.

Next, a method for de-enabling an illegal device in a WLAN system according to an exemplary embodiment of the present invention will be described.

According to the embodiment of the present invention, if the dependent STA reports an illegal device detected thereby to the enabling STA, the enabling STA de-enables the illegal device.

Accordingly, a procedure for detecting and reporting an illegal device, performed by the dependent STA, will first be described.

An illegal device refers to a white space band device, for example, a TV Band Device (TVBD) which attempts to operate in an unavailable channel or is operating in an unavailable channel, without conforming to regulation. For instance, a dependent STA may occupy an unlicensed channel in a geo-location thereof through an intentional method such as fake registration. In addition, location information of a specific AP may be wrongly registered due to an error of a GPS receiver, an insufficient GPS signal, a GPS jammer, etc. so that the AP may obtain incorrect available channel information. Such illegal dependent AP may transmit an enabling signal in an unlicensed channel irrespective of a scheme of the enablement procedure. At this time, an unlicensed channel used by an illegal TVBD may be an illegal channel. In other words, the unlicensed channel may be a channel, use of which is limited by regulation or may be a channel used by a licensed device at a corresponding time.

Dependent STAs which are normally operating may detect enabling signals in various types of measurement and monitoring procedures including a DSE measurement procedure. The dependent STAs determine whether the detected enabling signals are legal. If it is determined that an unlicensed frequency band is used, the dependent STAs may report this fact to enabling STAs.

There may be many methods through which the dependent STA judges the legality of an enabling signal, typically including (1) a method for voluntarily judging, at the dependent STA, the legality of an enabling signal received using an available channel list belonging to the dependent STA, and (2) a method for commanding, at the enabling STA, the dependent STA to perform monitoring as to whether an illegal device for specific channels is present.

First, the method for voluntarily judging, at the dependent STA, the legality of an enabling signal received using an available channel list belonging to the dependent STA will now be described.

A dependent STA which normally operates may obtain an available channel list from an enabling STA during an enablement procedure or after the enablement procedure is successfully performed. If the obtained available channel list is valid, the dependent STA may detect an illegal device using the obtained available channel list.

The dependent STA may judge the legality of an STA which has transmitted an enabling signal by receiving the enabling signal or may judge the legality of an STA which has transmitted an available channel list by receiving the available channel list.

The method for judging the legality of an STA which has transmitted an enabling signal by receiving the enabling signal will now be described. The dependent STA may monitor one or more channels while performing a normal operation or during a time duration designated to monitor channels. At this time, the dependent STA may monitor not only channels included in the available channel list but also channels which are not included in the available channel list and may receive an enabling signal in a specific channel while performing monitoring. The dependent STA compares a channel from which the received enabling signal is detected with channel information of the available channel list belonging thereto. If the channel from which the received enabling signal is detected is not included in the available channel list, the dependent STA may determine that the STA which has transmitted the corresponding enabling signal is an illegal device.

Next, the method for judging the legality of an STA which has transmitted an available channel list by receiving the available channel list will be described. The dependent STA may determine whether an STA which has transmitted an available channel list is an illegal device by receiving the available channel list from an STA other than an enabling STA thereof. The dependent STA may acquire the available channel list during an enablement procedure or after the enablement procedure is successfully performed. The dependent STA may obtain a first available channel list from an enabling STA thereof and may obtain a second available channel list from an STA other than the enabling STA. In other words, the dependent STA may acquire the available channel lists from the different two STAs. If the second available channel list is different from the first available channel list, the dependent STA may judge that the STA which has transmitted the second available channel list is an illegal device.

An example of an illegal device detection procedure is described when the dependent STA detecting an illegal device is a non-AP STA. The non-AP STA may receive an available channel list from an AP associated therewith. The AP may register a geo-location thereof in a DB or an enabling STA and may obtain the available channel list at a corresponding location. The AP may transmit the available channel list thereof to a non-AP STA. In this case, the non-AP STA corresponds to an STA, of which FCC ID is proved to be valid by the AP by accessing the DB. That is, the non-AP STA periodically receives the available channel list from the AP associated therewith and may obtain the available channel list from the enabling STA periodically or when necessary. If the available channel list received from the AP associated with the non-AP STA is not equal to the available channel list received from the enabling STA, the non-AP STA may determine that the AP associated therewith is an illegal device.

In addition, when determining whether a specific STA is an illegal device, the dependent STA may use information as to which device types are included in the available channel list belonging thereto and which device type the specific STA is.

Namely, in order to judge the legality of a specific STA using an enabling signal received from the specific STA, the dependent STA should be aware of which device types are included in the available channel list belonging thereto and which device type the specific STA which has transmitted the enabling signal is.

The device type refers to a type of a TV band device which is defined according to which channel bands are permitted to be used by TV band devices operating in a TVWS band and according to types of supported spectrum mask classes.

This is because frequency bands permitted for use differ according to devices by regulations, or an available channel number and a maximum transmission power value in a corresponding channel may be variously changed due to variation of spectrum mask classes supported by devices even if the permitted frequency bands are not different.

The enabling STA or AP may inform the dependent STA of which device types an available channel list includes so that the dependent STA may identify to which device type the obtained available channel list is applied. Desirably, the enabling STA or AP may transmit information as to which device types the available channel list includes while transmitting the available channel list to the dependent STA.

The dependent STA may receive an enabling signal from a channel which is not included in the available channel list belonging thereto. However, the STA transmitting the enabling signal may be permitted to use a corresponding channel according to device type. Accordingly, the STA transmitting the enabling signal may include a device type thereof in the enabling signal so that the dependent STA may consider a device type of the STA transmitting the enabling signal. If the enabling signal includes the available channel list, the STA transmitting the enabling signal may include a device type in the available channel list. If the enabling signal does not include the available channel list, the STA transmitting the enabling signal may add a device type field to the enabling signal or may transmit signaling indicating a device type together with the enabling signal.

Figure 5:
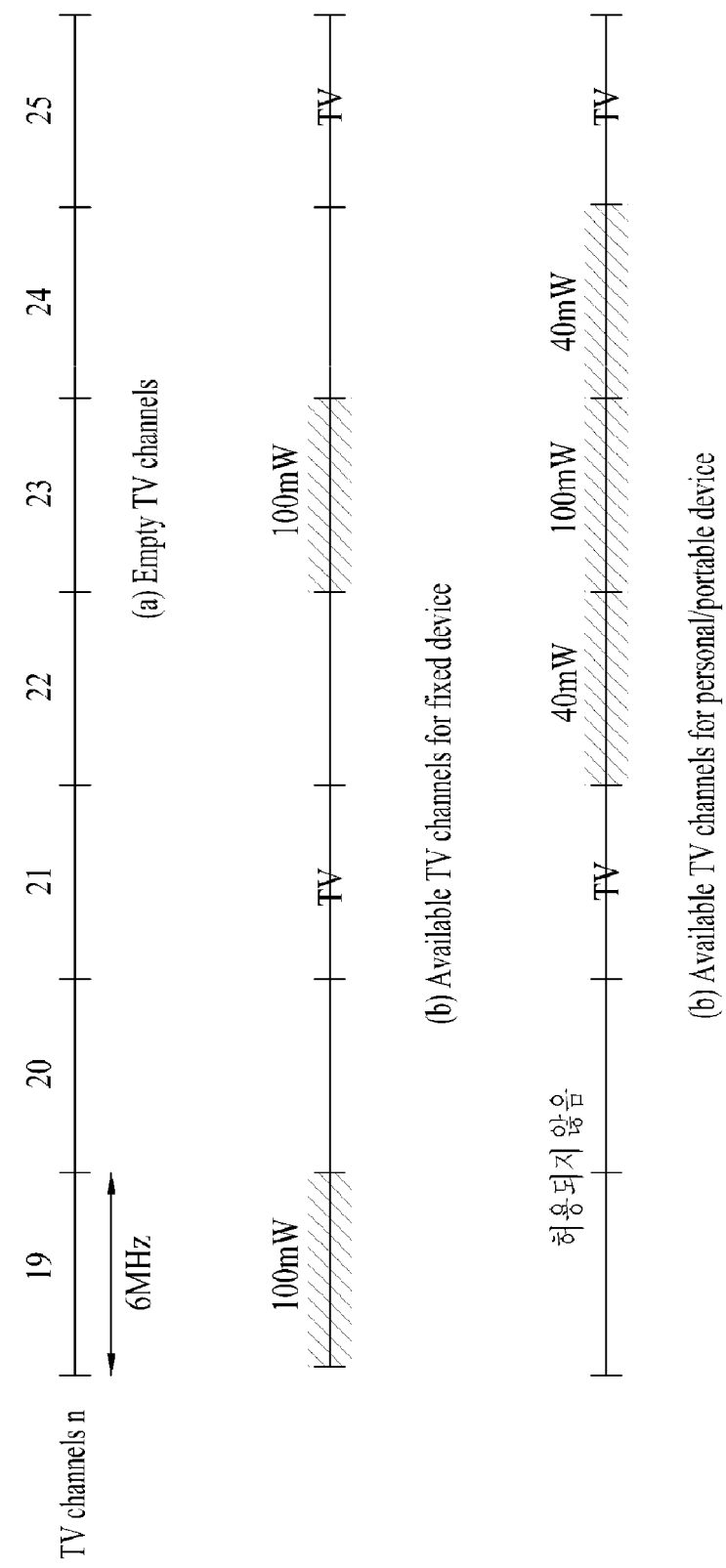
FIG. 5 is a diagram illustrating an example of an available TV channel according to device type.

FIG. 5 is a diagram illustrating an example of an available TV channel according to device type. For example, the device type may include a fixed device and a personal/portable device. FIG. 5(a) shows available channels and a maximum power value of the fixed device and FIG. 5(b) shows available channels and a maximum power value of the personal/portable device.

For example, 18 channels in 54 to 60 MHz, 76 to 88 MHz, 174 to 216 MHz, and 470 to 512 MHz are permitted to be used only by the fixed device and 30 channels in 512 to 608 MHz and 614 to 698 MHz are permitted to be used by both the fixed device and personal/portable device, by FCC regulation. In addition, the fixed device cannot use a channel right next to a TV channel which is being used by a licensed device. However, the personal/portable device may use a channel right next to a TV channel which is being used by a licensed device under the condition of reducing an allowable maximum power value from 100 mW to 40 mW. Therefore, available channels vary according to device type as shown in FIG. 5.

When the dependent STA receives an enabling signal from a second AP in a monitoring procedure during a normal operation in association with a first AP, if the received enabling signal has been transmitted through a channel used by a license device, the dependent STA may determine that the second AP is an illegal device regardless of a device type to which an available channel list belonging thereto is applied and a device type of the second AP.

However, since availability of a channel and a maximum power value may vary according to device type even though the channel is not occupied by a licensed device, if the dependent STA receives the enabling signal from the second AP in a channel other than the channel occupied by a licensed device, it may be desirable to determine whether the second AP is an illegal device in consideration of a device type to which an available channel list belonging to the dependent STA is applied and a device type of the second AP.

For example, assuming that a device type of the available channel list belonging to the dependent STA is a fixed device, even when the dependent STA receives the enabling signal from the second AP in a channel number 22 or 24, if the device type of the second AP included in the received enabling signal is a personal/portable device, the dependent STA determines that the second AP is not an illegal device.

Assuming that a device type of the available channel list belonging to the dependent STA is a personal/portable device, even when the dependent STA receives the enabling signal from the second AP in a channel number 19, if the device type of the second AP included in the received enabling signal is a fixed device, the dependent STA determines that the second AP is not an illegal device.

Next, the method for commanding, at the enabling STA, the dependent STA to perform monitoring as to whether an illegal device for specific channels is present will be described.

The enabling STA may request the dependent STA to monitor an enabling signal in specific channels. A frame transmitted by the enabling STA to the dependent STA to request monitoring may designate a monitoring target channel list and a monitoring time duration. Since monitoring target channels are occupied by a licensed device rather than by available channels, they may be channels which can be used by an unlicensed device at a corresponding time. Upon receiving an enabling signal from the monitoring target channel, the dependent STA may determine that an STA transmitting the received enabling signal is an illegal device.

FIG. 6 is a diagram illustrating an example of a format of a TVBD measurement request frame transmitted by an enabling STA to a dependent STA to request monitoring. FIG. 7 is a diagram illustrating another example of a format of a TVBD measurement request frame transmitted by an enabling STA to request monitoring to a dependent STA. In FIG. 6, a channel that the enabling STA requests the dependent STA to monitor is indicated by a WLAN channel. In FIG. 7, a channel that the enabling STA requests the dependent STA to monitor is indicated by a TV channel.

As shown in FIG. 6, the TVBD measurement request frame may include a category field, an action value field, a requester STA address field, a responder STA address field, an operating class field, a channel number field, a measurement start time field, and a measurement duration field.

Alternatively, the TVBD measurement request frame may include, as shown in FIG. 7, a category field, an action value field, a requester STA address field, a responder STA address field, a TV channel number field, a measurement start time field, and a measurement duration field.

The measurement start time field indicates when an STA starts monitoring and the measurement duration field denotes a time duration during which the STA performs monitoring.

The operating class field and the channel number field denote a number of a WLAN channel that the enabling STA requests the dependent STA to monitor. The TV channel number field denotes a number of a TV channel that the enabling STA requests the dependent STA to monitor. In this case, the dependent STA receives an enabling signal to detect an illegal device by monitoring the WLAN channel designated by the operating class field and the channel number field or monitoring the TV channel indicated by the TV channel number field.

Alternatively, the enabling STA may request the dependent STA to monitor channels except for the WLAN channel designated by the operating class field and the channel number field of FIG. 6. The enabling STA may also request the dependent STA to monitor channels except for the TV channel designated by the TV channel number field of FIG. 7. In this case, the dependent STA may receive an enabling signal to detect an illegal device by monitoring WLAN channels except for the WLAN channel designated by the operating class field and the channel number field or monitoring TV channels except for the TV channel designated by the TV channel number field.

Even when the enabling STA requests the dependent STA to monitor an enabling signal in specific channels, it is desirable that the dependent STA be aware of a device type of an available channel list belonging thereto and a device type of an STA which has transmitted the enabling signal received in a monitoring procedure. Accordingly, a device type is desirably included in the available channel list obtained by the dependent STA or information about a device type to which the available channel list is applied is desirably transmitted to the dependent STA. It is also desirable that a device type of the STA which has transmitted the enabling signal be included in the enabling signal.

Upon detecting an illegal device, the dependent STA may report detection of the illegal device to the enabling STA.

The report message may include a MAC address of an illegal device, an address of an enabling STA of the illegal device, and an illegal channel number. The illegal channel refers to a channel which is being illegally used by the illegal device.

If the enabling STA commands the dependent STA to perform monitoring as to whether an illegal device for specific channels is present, the report message may be transmitted as a response to the TVBD measurement request frame. If the dependent STA has detected the illegal device without request of the enabling STA, the dependent STA may autonomously transmit the report message.

FIG. 8 illustrates a format of a TVBS measurement report frame for reporting, at a dependent STA, detection of an illegal device to an enabling STA thereof.

As shown in FIG. 8, the TVBD measurement report frame may include a category field, an action value field, a requester STA address field, a responder STA address field, a measurement start time field, a measurement duration field, an illegal TVBD address field, an enabling STA address of illegal TVBD field, and an illegal TVBD channel number field.

The illegal TVBD address field denotes an address of an STA determined as an illegal device by the dependent STA. In other words, the illegal TVBD address field indicates an address of an illegal TVBD which is using a TVWS band not permitted to be used by regulation.

The enabling STA address of illegal TVBD field denotes an address of an enabling STA of an STA determined as an illegal device by the dependent STA.

The illegal TVBS channel number field denotes a channel number which is being illegally used by an STA determined as an illegal device by the dependent STA.

As an example, a TV channel number list may be used as a value of the illegal TVBD channel number field. If the enabling STA commands the dependent STA to monitor a WLAN channel, the dependent STA may check to which TV channel a WLAN channel detecting an illegal device corresponds and may report the corresponding TV channel number to the enabling STA. If the enabling STA commands the dependent STA to monitor a TV channel, the dependent STA may report a TV channel number in which an illegal device is detected to the enabling STA.

Next, a procedure through which the enabling STA de-enables an illegal device will be described.

A de-enablement procedure may differ according to whether an enabling STA of an illegal device is equal to an enabling STA of a dependent STA detecting the illegal device. Accordingly, in an exemplary embodiment of the present invention, description will be given of a de-enablement procedure when the enabling STA of the illegal device is equal to the enabling STA of the dependent STA detecting the illegal device and a de-enablement procedure when the enabling STA of the illegal device is different from the enabling STA of the dependent STA detecting the illegal device.

Figure 9:
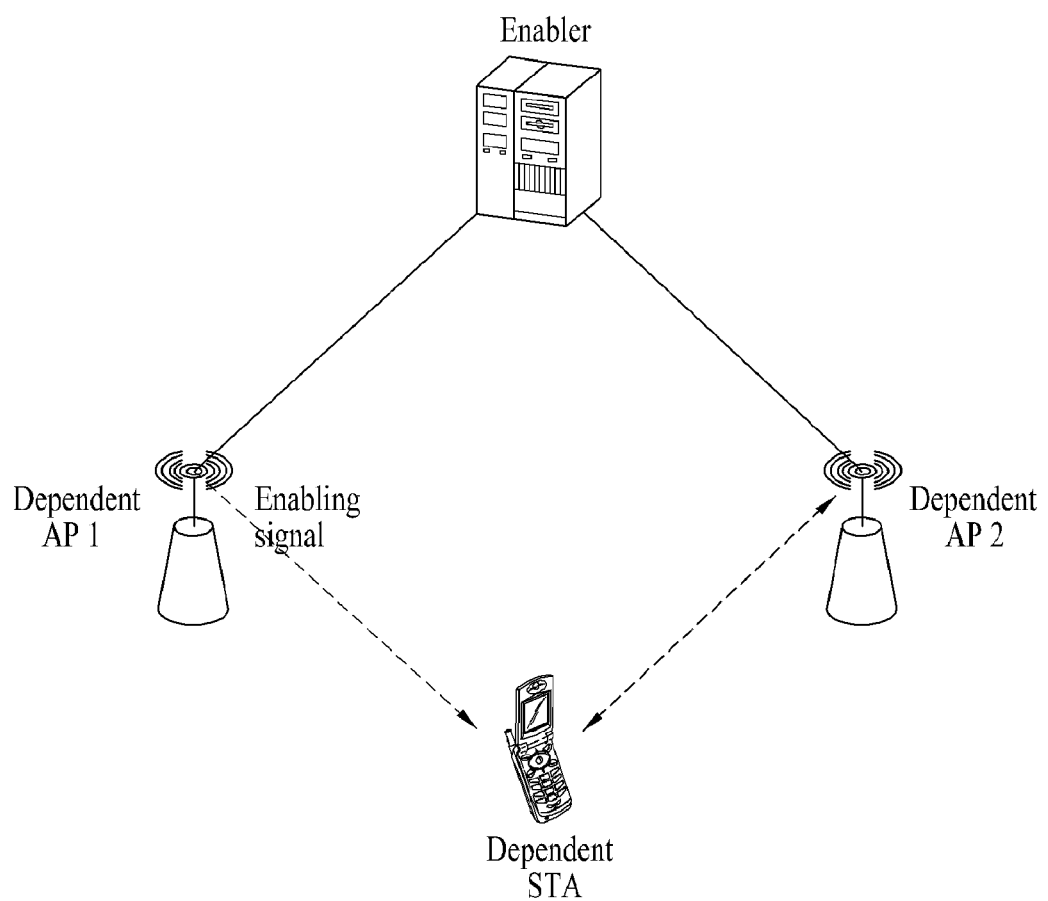
FIG. 9 is a diagram illustrating the case in which an enabling STA of an illegal device is equal to an enabling STA of a dependent STA detecting the illegal device.
Figure 10:
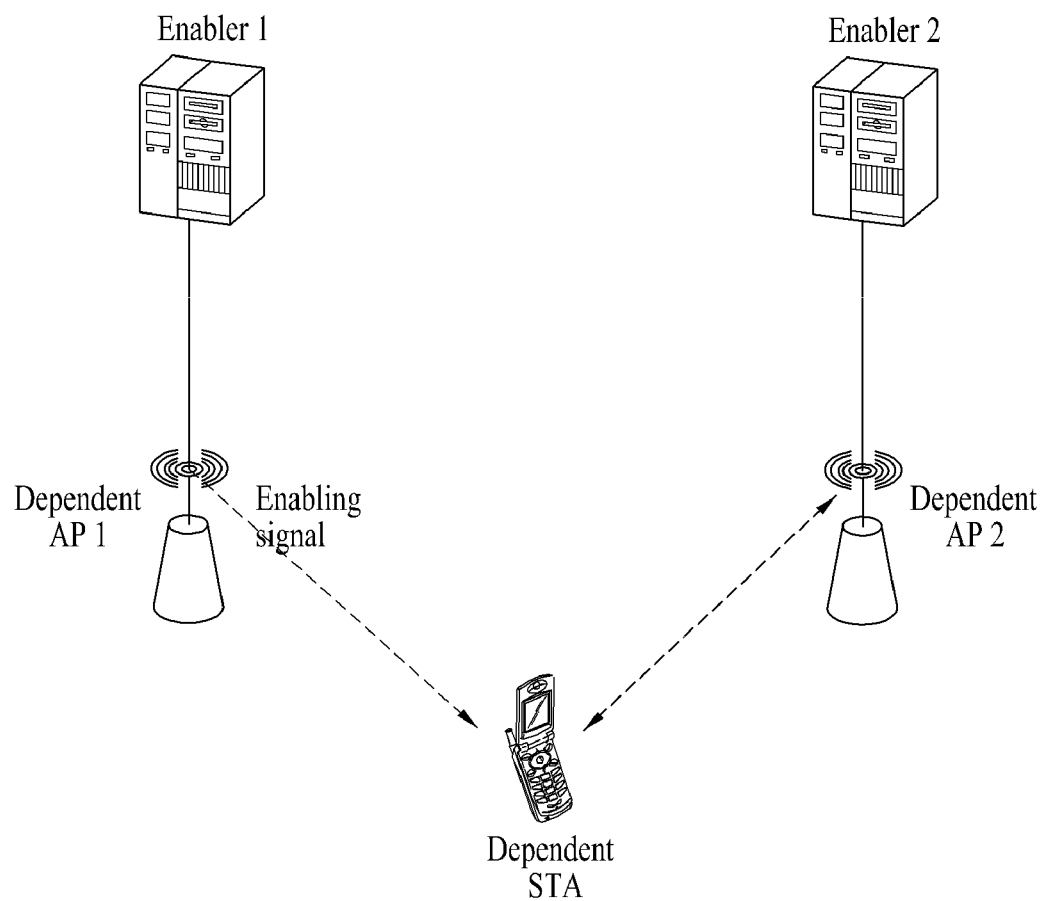
FIG. 10 is a diagram illustrating the case in which an enabling STA of an illegal device is different from an enabling STA of a dependent STA detecting the illegal device.

FIG. 9 is a diagram illustrating the case in which an enabling STA of an illegal device is equal to an enabling STA of a dependent STA detecting the illegal device, and FIG. 10 is a diagram illustrating the case in which an enabling STA of an illegal device is different from an enabling STA of a dependent STA detecting the illegal device.

To determine whether an enabling STA of an illegal device is equal to an enabling STA of a dependent STA detecting the illegal device, it is desirable that information about the enabling STA of the illegal device be broadcast. In FIG. 9 and FIG. 10, a dependent STA receives an enabling signal from a dependent AP 1 corresponding to an illegal TVBD. When the dependent STA is not aware of information about an enabling STA of the dependent AP 1 and transmits a frame which does not include the information about the enabling STA, if the enabling STA receiving the information is not an STA enabling an illegal TVBD, the enabling STA cannot direct de-enablement of the corresponding illegal TVBS. Accordingly, the dependent STA should be able to confirm to which enabling STA the illegal TVBD is connected.

To this end, a method for explicitly indicating an enabling STA is needed. In the exemplary embodiment of the present invention, it is proposed that the dependent STA broadcast a DSE identifier element including an address of an enabling STA enabling the dependent STA. If the dependent STA transmitting the DSE identifier element is an AP, the DSE identifier element may be included in a beacon frame or a probe response frame.

FIG. 11 is a diagram illustrating a format of a DSE identifier element. As shown in FIG. 11, the DSE identifier element may include an element ID field, a length field, an enabling STA address field, and an enabling STA timestamp field.

The enabling STA address field denotes an address of an enabling STA which enables an STA transmitting the DSE identifier element. The enabling STA timestamp field denotes a timestamp of an enabling STA for time synchronization between an enabling STA, a dependent AP, and a dependent STA associated with the AP.

First, a procedure for de-enabling an illegal device when an enabling STA of the illegal device is identical to an enabling STA of a dependent STA detecting the illegal device will now be described.

The dependent STA which has detected an illegal device may transmit a report message to an enabling STA thereof. Upon receiving the report message, the enabling STA may determine whether to de-enable the illegal device using additional information (e.g. information as to whether the illegal device is connected thereto or information as to whether to de-enable a CM which will be described later).

If the enabling STA determines that the illegal device should be de-enabled, the dependent STA may direct the enabling STA to transmit a de-enablement frame to the illegal device using a MAC address of the illegal device included in the received massage. Upon receiving the de-enablement frame, the illegal device may stop transmission in a corresponding channel and transition to an un-enabled state.

In FIG. 9, if the dependent STA receives an enabling signal from the dependent AP 1 and judges that the dependent AP 1 is an illegal device by using the enabling signal, the dependent STA may transmit a report message including a MAC address of the dependent AP 1 to an enabling STA (enabler). Upon receiving the report message, the enabler may determine whether to de-enable the dependent AP 1 through additional information. If it is determined that the dependent AP 1 should be de-enabled, the enabler may transmit a de-enablement frame to the dependent AP 1 using a MAC address in the report message. Upon receiving the de-enablement frame, the dependent AP 1 may stop transmission in a corresponding channel and transition to an un-enabled state.

The de-enablement frame may use, for example, the same format as a de-enablement frame proposed in IEEE 802.11y. FIG. 12 is a diagram illustrating a format of a de-enablement frame.

Next, a procedure for de-enabling an illegal device when an enabling STA of the illegal device is different from an enabling STA of a dependent STA detecting the illegal device will be described with reference to FIG. 13 to FIG. 15.

Figure 13:
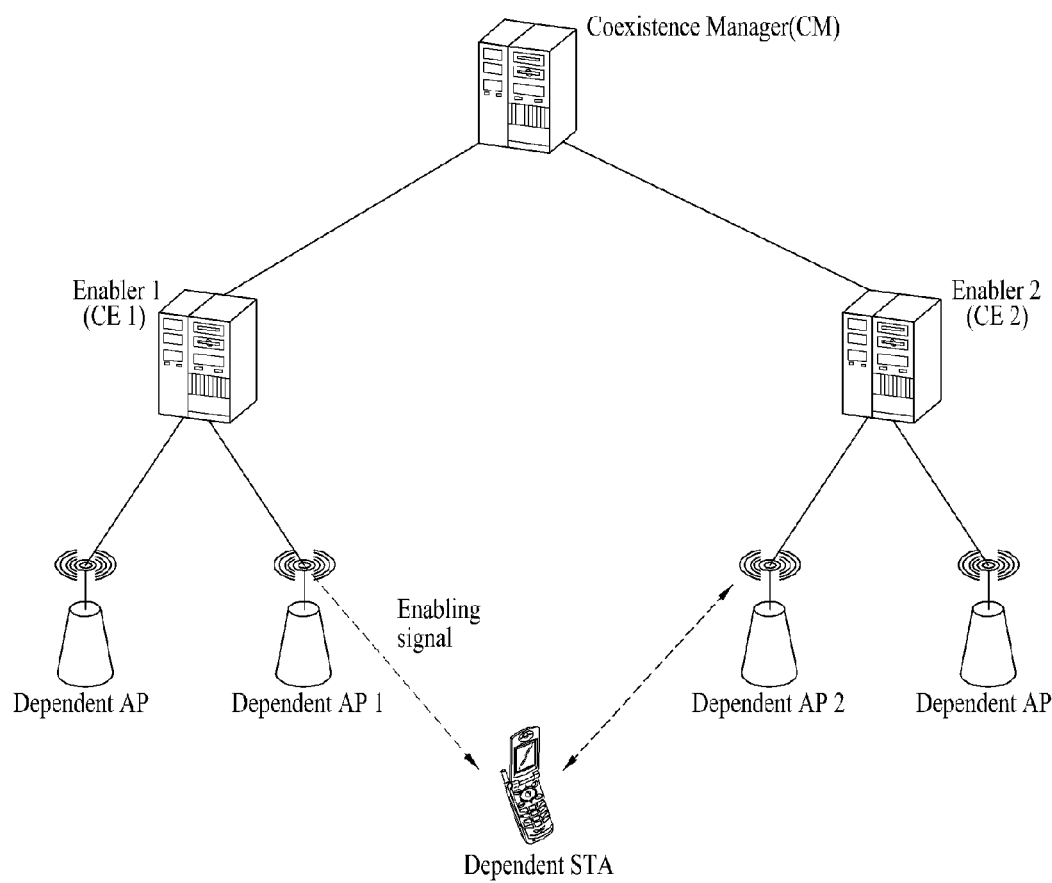
FIG. 13 is a diagram illustrating a procedure for de-enabling an illegal device when an enabling STA of the illegal device is different from an enabling STA of a dependent STA detecting the illegal device.

FIG. 13 is a diagram illustrating a procedure for de-enabling an illegal device when an enabling STA of the illegal device is different from an enabling STA of a dependent STA detecting the illegal device.

In FIG. 13, a Coexistence Manager (CM) is an entity which can perform resource assignment in order to solve an inference problem between Coexistence Enablers (CEs) connected thereto while including an interface with a DB and providing policy and guidelines associated with coexistence, for coexistence between different systems operating in a TVWS and an enterpriser. A CE is an entity serving to transmit requests and information received from the CM to a TVBD through an interface with the TVBD. In the exemplary embodiment of the present invention, a structure including a management server such as a CM is assumed as a high layer entity which can control a plurality of enabling STAs.

Upon detecting an illegal device, the dependent STA may transmit a report message to an enabling STA (enabler 2) thereof. If the enabler 2 receiving the report message is not an enabling STA of the illegal device, the enabler 2 may transmit a TVWS coexistence information frame in order to report information about the illegal device to the CM.

The TVWS coexistence information frame is an information frame defined for coexistence between different systems in a TVWS and an enterpriser and may include an information type field indicating which information the frame is about.

The TVWS coexistence information frame for reporting an illegal device may include a MAC address of the illegal device, an address of an enabling STA of the illegal device, and a channel list which is illegally used by the illegal device, which are information included in a report message received by the enabling STA from the dependent STA, and may include information of a dependent STA which has detected the illegal device and an enabling STA receiving a report message from the dependent STA which has detected the illegal device.

FIG. 14 is a diagram illustrating a format of a TVWS coexistence information frame.

As shown in FIG. 14, the TVWS coexistence information frame may include an information type field, a length field, a requester STA address field, a responder STA address field, an actual measurement start time field, a measurement duration field, a policed TVBD address field, an enabling STA address of policed TVBD field, an illegal TVBD address field, an enabling STA address of illegal TVBD field, and an illegal TVBD channel number field.

The information type field indicates that the TVWS coexistence information frame is a frame for reporting detection of an illegal device. The requester STA address field denotes an address of a CE transmitting the TVWS coexistence information frame. The responder STA address field denotes an address of a CM receiving the TVWS coexistence information frame. The actual measurement start time field denotes an actual start time of a duration during which channel measurement is performed to detect the illegal device. The measurement duration field denotes a duration during which channel measurement is performed to detect the illegal device.

The policed TVBD address field denotes an address of a TVBD detecting the illegal device. The enabling STA address of policed TVBD field denotes an enabling STA of a TVBD detecting the illegal device. The illegal TVBD address field denotes an address of the illegal device using a TVWS spectrum which is not permitted to be used by regulation. The enabling STA address of illegal TVBD field denotes an address of an enabling STA of the illegal device. The illegal TVBD channel number field denotes a channel number for a TVWS spectrum which is being illegally used by the illegal device.

Upon receiving the TVWS coexistence information frame, the CM checks the information type field to confirm whether the received TVWS coexistence information frame is a report for detection of the illegal device and may determine whether to de-enable the illegal device using additional information (e.g. coexistence information). If it is determined that the illegal device should be de-enabled, the CM confirms information of the illegal device included in the TVWS coexistence information frame to transmit a TVWS coexistence command to the enabling STA of the illegal device. The TVWS coexistence command frame is a command frame defined for coexistence between different systems in a TVWS and an enterpriser and may include a command type field indicating which command the command frame is about. The TVWS coexistence command frame for de-enabling the illegal device may include information about the illegal device.

FIG. 15 is a diagram illustrating a format of a TVWS coexistence command frame.

As shown in FIG. 15, the TVWS coexistence command frame may include a command type field, a length field, a requester STA address field, a responder STA address field, an actual measurement start time field, a measurement duration field, a policed TVBD address field, an enabling STA address of policed TVBD field, an illegal TVBD address field, and an illegal TVBD channel number field.

The command type field indicates that the corresponding TVWS coexistence command frame is a frame for de-enabling an illegal device. The requester STA address field indicates an address of a CM transmitting the TVWS coexistence command frame. The responder STA address field indicates an address of a CE receiving the TVWS coexistence command frame, i.e. an address of an enabling STA of the illegal device. The actual measurement start time field indicates an actual start time of a duration during which channel measurement is performed to detect the illegal device. The measurement duration field indicates a duration during which channel measurement is performed to detect the illegal device.

The policed TVBD address field indicates an address of a TVBD detecting the illegal device. The enabling STA address of policed TVBD field indicates an enabling STA of a TVBD detecting the illegal device. The illegal TVBD address field indicates an address of the illegal device using a TVWS spectrum which is not permitted to be used by regulation. The illegal TVBD channel number field indicates a channel number for a TVWS which is being illegally used by the illegal device.

Upon receiving the TVWS coexistence command frame, an enabling STA checks the command type, and if it is confirmed that the TVWS coexistence command frame is for de-enabling the illegal device, the enabling STA may transmit a de-enablement frame to the illegal device by confirming the illegal TVBD address field. Upon receiving the de-enablement frame, the illegal device may stop transmission in a corresponding channel and transition to an un-enabled state.

Figure 16:
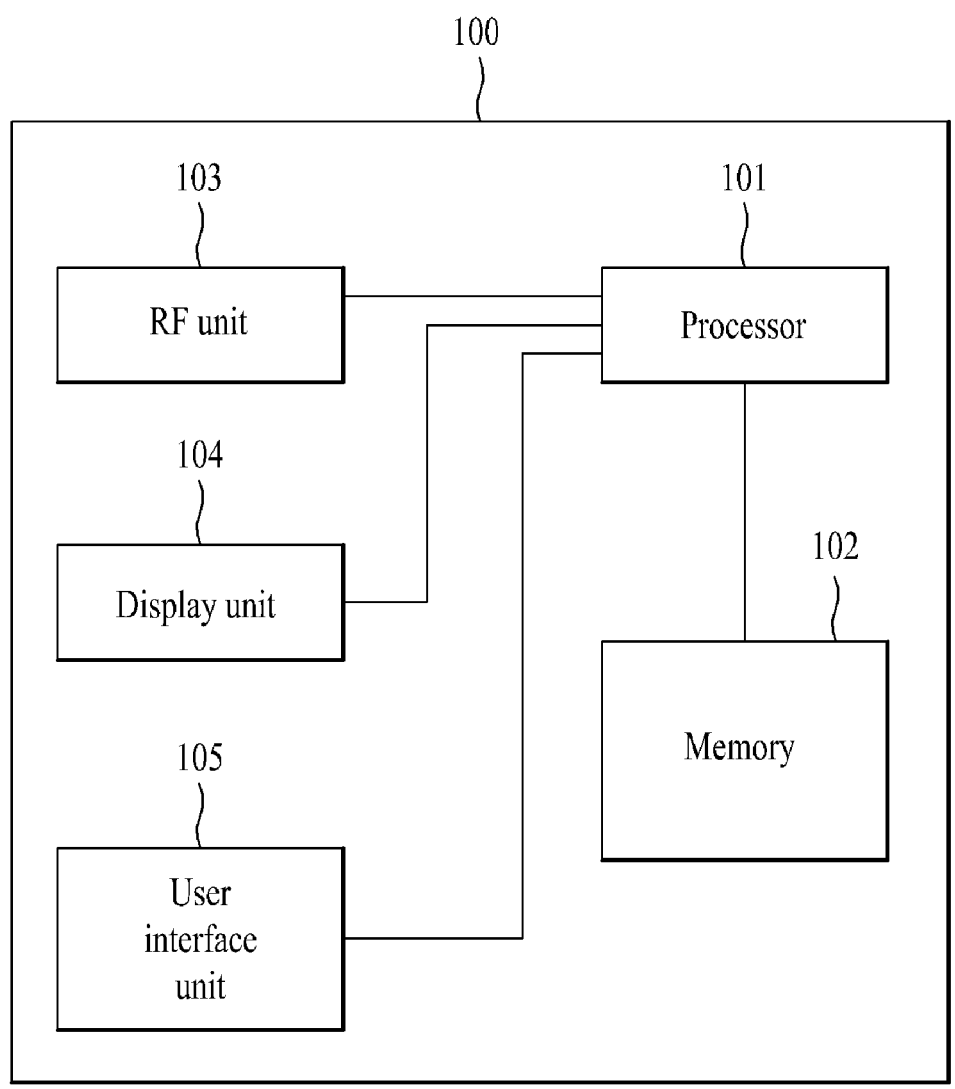
FIG. 16 is a block diagram illustrating the configuration of a device which can be applied to an STA or an AP and can implement the present invention.

FIG. 16 is a block diagram illustrating the configuration of a device which can be applied to an STA or an AP and can implement the present invention. As shown in FIG. 16, a device 100 includes a processor 101, a memory 102, a Radio Frequency (RF) unit 103, a display unit 104, and a user interface unit 105.

A layer of a physical interface protocol is performed in the processor 101. The processor 101 provides a control plane and a user plane. A function of each layer may be performed in the processor 101.

The memory 102 is electrically connected to the processor 101 and stores operating systems, application programs, and general files.

If the device 100 is a user equipment, the display unit 104 may display various information and may be implemented using a known Liquid Crystal Display (LCD), an Organic Light Emitting Diode (OLED), etc. The user interface unit 105 may be combined with a known user interface such as a keypad, a touchscreen, etc.

The RF unit 103 is electrically connected to the processor 101 and transmits or receives radio signals. The RF unit 103 may include a transmission module and a reception module.

The transmission module may be scheduled from the processor 101 to perform prescribed coding and modulation upon signals and/or data to be transmitted to the exterior and may transmit the coded and modulated signals and/or data to antennas. A transmitter of a dependent AP transmits a DSE registered location element, and a DSE link identifier element including a MAC address of an enabling STA to a dependent STA. A transmitter of the dependent STA transmits a DSE enablement request frame to an enabling STA.

The reception module may perform decoding and demodulation upon radio signals received through external antennas to restore the radio signals to original data and may transmit the restored data to the processor 101.

The detailed description of the exemplary embodiments of the present invention disclosed as described above has been presented to enable any person of ordinary skill in the art to make and practice the present invention. Modifications to the preferred embodiment will be readily apparent to those of ordinary skill in the art, and the disclosure set forth herein may be applied to other embodiments and applications without departing from the spirit and scope of the present invention and the appended claims. Thus, the present invention is not intended to be limited to the embodiments described, but is to be accorded the broadest scope consistent with the claims appended hereto and the disclosure set forth herein.

INDUSTRIAL APPLICABILITY

Although the various embodiments of the present invention have been described based on the IEEE 802.11 system, they may be applied in the same way to a variety of mobile communication systems which can operate by acquiring available channel information by an unlicensed device.

The invention claimed is:

1. A method for an enabler entity to indicate an event to a manager entity, the method comprising:
receiving, from a first unlicensed device served by the enabler entity, a report message reporting an illegal device detection event in the first unlicensed device; and
transmitting, from the enabler entity to the manager entity, an event indication message indicating the illegal device detection event in the first unlicensed device served by the enabler entity,
wherein the enabler entity enables communication between the first unlicensed device and the manager entity,
wherein the manager entity exchanges information required for coexistence between enabler entities comprising the enabler entity,
wherein the event indication message comprises:
type information indicating that the event indication message is for indicating that a second unlicensed device is detected by the first unlicensed device, the second unlicensed device operating on a licensed TV frequency not permitted to the second unlicensed device and without complying with regulations, and the first unlicensed device operating on the licensed TV frequency with permission and under the regulations,
wherein whether the second unlicensed device complies with the regulations is determined in consideration of whether the second unlicensed device is a fixed type device or a portable type device, and
wherein the illegal device detection event in the first unlicensed device is reported only when the first unlicensed device and the second device belong to a same type.

2. The method of claim 1, wherein the event indication message further comprises:
an identification information of the second unlicensed device; and
a channel number on which the second unlicensed device is operating.

3. The method of claim 1, wherein the enabler entity comprises a coexistence enabler (CE), and the manager entity comprises a coexistence manager (CM).

4. The method of claim 1, wherein the first unlicensed device and the second unlicensed device comprise a television band device (TVBD).

5. The method of claim 1,
wherein the event indication message transmitted from the enabler entity to the manager entity is transmitted when the second unlicensed device is not served by the enabler entity.

6. The method of claim 1, wherein the event indication message further comprises:
a source identifier indicating an identifier of the enabler entity; and
a destination identifier indicating an identifier of the manager entity.

7. An enabler entity indicating an event to a manager entity, the enabler entity comprising:
a radio frequency (RF) unit configured to receive, from a first unlicensed device served by the enabler entity, a report message reporting an illegal device detection event in the first unlicensed device; and
a processor configured to
generate an event indication message indicating an event in a first unlicensed device served by the enabler entity,
and control the RF unit to transmit the event indication message to the manager entity,
wherein the enabler entity enables communication between the first unlicensed device and the manager entity and the manager entity exchanges information required for coexistence between enabler entities comprising the enabler entity,
wherein the event indication message comprises:
type information indicating that the event indication message is for indicating that a second unlicensed device is detected by the first unlicensed device, the second unlicensed device operating on a frequency not permitted to the second unlicensed device and without complying with regulations, and the first unlicensed device operating on the licensed TV frequency with permission and under the regulations,
wherein whether the second unlicensed device complies with the regulations is determined in consideration of whether the second unlicensed device is a fixed type device or a portable type device, and
wherein the illegal device detection event in the first unlicensed device is reported only when the first unlicensed device and the second device belong to a same type.

8. The enabler entity of claim 7, wherein the event indication message further comprises:
an identification information of the second unlicensed device; and
a channel number on which the second unlicensed device is operating.

9. The enabler entity of claim 7, wherein the enabler entity comprises a coexistence enabler (CE), and the manager entity comprises a coexistence manager (CM).

10. The enabler entity of claim 7, wherein the first unlicensed device and the second unlicensed device comprise a television band device (TVBD).

11. The enabler entity of claim 7,
wherein the event indication message transmitted by the RF unit to the manager entity is transmitted when the second unlicensed device is not served by the enabler entity.

12. The enabler entity of claim 7, wherein the event indication message further comprises:
a source identifier indicating an identifier of the enabler entity; and
a destination identifier indicating an identifier of the manager entity.

* * * * *